United States Patent
Michalicek

(10) Patent No.: US 7,019,885 B2
(45) Date of Patent: *Mar. 28, 2006

(54) HIDDEN FLEXURE ULTRA PLANAR OPTICAL ROUTING ELEMENT

(75) Inventor: M. Adrian Michalicek, Westminster, CO (US)

(73) Assignee: PTS Corporation, San Jose, CA (US)

(*) Notice: Subject to any disclaimer, the term of this patent is extended or adjusted under 35 U.S.C. 154(b) by 204 days.

This patent is subject to a terminal disclaimer.

(21) Appl. No.: 10/619,940

(22) Filed: Jul. 14, 2003

(65) Prior Publication Data

US 2004/0085607 A1  May 6, 2004

Related U.S. Application Data

(63) Continuation of application No. 09/859,069, filed on May 15, 2001, now Pat. No. 6,608,712.

(51) Int. Cl.
*G02B 26/00* (2006.01)
*H01L 41/04* (2006.01)

(52) U.S. Cl. .............. 359/290; 359/223; 359/295; 359/298; 310/333; 310/364

(58) Field of Classification Search ........ 359/223–224, 359/290–292, 295, 298; 310/36, 328, 333, 310/364, 68 R
See application file for complete search history.

(56) References Cited

U.S. PATENT DOCUMENTS

| | | |
|---|---|---|
| 4,330,175 A | 5/1982 | Fujii et al. |
| 5,212,582 A | 5/1993 | Nelson |
| 5,279,924 A | 1/1994 | Sakai et al. |
| 5,414,540 A | 5/1995 | Patel et al. |
| 5,497,262 A | 3/1996 | Kaeriyama |
| 5,600,383 A | 2/1997 | Hornbeck |
| 5,734,492 A | 3/1998 | Chung |
| 5,917,625 A | 6/1999 | Ogusu et al. |
| 5,940,203 A | 8/1999 | LaFiandra |
| 5,960,133 A | 9/1999 | Tomlinson |
| 5,999,288 A | 12/1999 | Ellinas et al. |
| 5,999,672 A | 12/1999 | Hunter et al. |
| 6,025,951 A * | 2/2000 | Swart et al. ......... 359/245 |
| 6,028,689 A | 2/2000 | Michalicek et al. |
| 6,040,935 A | 3/2000 | Michalicek |
| 6,097,519 A | 8/2000 | Ford |
| 6,097,859 A | 8/2000 | Solgaard |

(Continued)

OTHER PUBLICATIONS

T. Akiyama, et al.; "Controlled Stepwise Motion in Polysilicon Microstructures," Journal of Microelectromechanical Systems, vol. 2, No. 3, Sep. 1993; pp. 106-110.

(Continued)

*Primary Examiner*—Evelyn A. Lester
(74) *Attorney, Agent, or Firm*—Townsend and Townsend and Crew LLP

(57) ABSTRACT

The present invention provides improved MEMS devices and methods for use with fiber-optic communications systems. In one embodiment, an apparatus for steering light has a beam layer (160) with a reflective surface. The device uses a multi-layer electrode stack underlying the beam layer to rotate the beam layer into a desired position. Additionally, an underlying rotation and support structure provides a stable platform for the beam layer when the device is activated. In one embodiment, the underlying structure provides a multi-point landing system to maintain a generally flat beam layer upper surface when the device is activated.

18 Claims, 7 Drawing Sheets

U.S. PATENT DOCUMENTS

| | | | |
|---|---|---|---|
| 6,097,863 | A | 8/2000 | Chowdhury |
| 6,108,471 | A | 8/2000 | Zhang et al. |
| 6,128,122 | A | 10/2000 | Drake et al. |
| 6,147,790 | A | 11/2000 | Meier et al. |
| 6,253,001 | B1 | 6/2001 | Hoen |
| 6,307,657 | B1 | 10/2001 | Ford |
| 6,330,102 | B1 | 12/2001 | Daneman et al. |
| 6,337,760 | B1 * | 1/2002 | Huibers et al. ............. 359/291 |
| 6,449,096 | B1 | 9/2002 | Fabiny et al. |
| 6,501,877 | B1 | 12/2002 | Weverka et al. |
| 6,608,712 | B1 * | 8/2003 | Michalicek ................ 359/224 |
| 2002/0039225 | A1 | 4/2002 | Meier et al. |
| 2002/0118472 | A1 | 8/2002 | Hill |
| 2002/0135850 | A1 | 9/2002 | Hagelin et al. |
| 2002/0149834 | A1 | 10/2002 | Mei et al. |
| 2003/0011863 | A1 | 1/2003 | Muller |

OTHER PUBLICATIONS

C.M.A. Ashruf, et al., "Galvanic porous silicon formation without external contacts," Sensors and Actuators 74 (1999) pp. 118-122.

Kenneth Bean, et al., "Anisotropic Etching of Silicon," IEEE Transactions on Electron Devices, vol. Ed-25, No. 10, Oct. 1978.

Dino R. Ciarlo, "A latching accelerometer fabricated by the anisotropic etching of (110) oriented silicon wafers," Lawrence Livermore Nat'l Laboratory, Mar. 1, 1992.

A.S. Dewa, et al., "Development of a Silicon Two-Axis Micromirror for an Optical CrossConnect," Solid State Sensors and Actuators Workshop, Hilton Head, South Carolina, pp. 93-96, no date available.

Joseph Ford et al., "Wavelength Add Drop Switching Using Tilting Micromirrors," Journal of Lightwave Technology, vol. 17, No. 5, May 1999.

J. Grade et al., A Large-Deflection Electrostatic Actuator for Optical Switching Applications, Solid-State Sensor and Actuator Workshop, Hilton Head Island, South Carolina, Jun. 4-8, 2000; pp. 97-100.

Robert E. Hopkins, *Some Thoughts On Lens Mounitng*, Optical Engineering, Sep.-Oct. 1976, vol. 15, No. 5, pp. 428-430.

V. Kaajakari et al.; "Ultrasonic Actuation for MEMS Dormancy-Related Stiction Reduction," In MEMS Reliability for Critical Applications, Proceedings of SAPIE vol. 4180 (2000); pp. 60-65.

T.L. Koch et al., "Anisotropically etched deep gratings for InP/InGaAsP optical devices," J.App. Phys. 62 (8), Oct. 15, 1987.

I. Nishi et al., "Broad-Passband-Width Optical Filter for Multi-Demultiplexer Using a Diffraction Grating and a Retoreflector Prism," Electronics Letters, vol. 21, No. 10, 9th May 1985.

P. Phillippe et al., "Wavelength demultiplexer: using echelette gratings on silicon substrate," Applied Optics, vol. 24, No. 7, Apr. 1, 1985.

R. D. Rallison, White Paper on: *Dense Wavelength Division Multiplexing (DWDM) and the Dickson Grating*, Jan. 6, 2001, 9 pages.

M. Schilling et al., "Deformation-free overgrowth of reactive ion beam etched submicron structures in InP by liquid phase epitaxy," Appl. Phys. Lett. 49 (12), Sep. 22, 1986.

Z. J. Sun et al., Demultiplexer with 120 channels and 0.29-nm Channel Spacing, IEEE Photonics Technology Letters, vol. 10, No. 1, Jan. 1998.

W. Tang, et al., "Electrostatically Balanced Comb Drive for Controlled Levitation," Reprinted from Technical Digest IEEE Solid-State Sensor and Actuator Workshop, Jun. 1990; pp. 198-202.

L. Torcheux et al., "Electrochemical Coupling Effects on the Corrosion of Silicon Samples in HF Solutions," J. Electrochem.Soc., vol. 142, No. 6, Jun. 1995.

P. VanKessel et al., "A MEMS-Based Projection Display," Proceedings of the IEEE, vol. 86, No. 8, Aug. 1998; pp. 1687-1704.

Microfabricated Silicon High Aspect Ratio Flexures for In-Plane Motion; dissertation by C. Keller, Fall 1998.

Gimballed Electrostatic Microactuators with Embedded Interconnects; dissertation by L. Muller; Spring 2000.

*Transducer Elements*, Piezo Systems, Inc., Cambridge MA, Catalog #3, 1998, pp. 30-45.

* cited by examiner

HIDDEN FLEXURE ULTRA PLANAR OPTICAL ROUTING ELEMENT

CROSS REFERENCE TO RELATED APPLICATIONS

This application is a continuation of Ser. No. 09/859,069, and relies on the benefit of the filing date of, now U.S. Pat. No. 6,608,712 B2, filed on May 15, 2001, the entire disclosure of which is incorporated herein by reference for all purposes.

BACKGROUND OF THE INVENTION

This invention relates generally to the field of micro-electrical-mechanical systems (MEMS), and in particular, to improved MEMS devices and methods of making same for use with fiber-optic communications systems.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today DWDM systems employing up to 80 channels are available from multiple manufacturers, with more promised in the future.

In all telecommunication networks, there is the need to connect individual channels (or circuits) to individual destination points, such as an end customer or to another network. Systems that perform these functions are called cross-connects. Additionally, there is the need to add or drop particular channels at an intermediate point. Systems that perform these functions are called add-drop multiplexers (ADMs). All of these networking functions are currently performed by electronics—typically an electronic SONET/SDH system. However SONET/SDH systems are designed to process only a single optical channel. Multi-wavelength systems would require multiple SONET/SDH systems operating in parallel to process the many optical channels. This makes it difficult and expensive to scale DWDM networks using SONET/SDH technology.

The alternative is an all-optical network. Optical networks designed to operate at the wavelength level are commonly called "wavelength routing networks" or "optical transport networks" (OTN). In a wavelength routing network, the individual wavelengths in a DWDM fiber must be manageable. New types of photonic network elements operating at the wavelength level are required to perform the cross-connect, ADM and other network switching functions. Two of the primary functions are optical add-drop multiplexers (OADM) and wavelength-selective cross-connects (WSXC).

In order to perform wavelength routing functions optically today, the light stream must first be de-multiplexed or filtered into its many individual wavelengths, each on an individual optical fiber. Then each individual wavelength must be directed toward its target fiber using a large array of optical switches commonly called an optical cross-connect (OXC). Finally, all of the wavelengths must be re-multiplexed before continuing on through the destination fiber. This compound process is complex, very expensive, decreases system reliability and complicates system management. The OXC in particular is a technical challenge. A typical 40–80 channel DWDM system will require thousands of switches to fully cross-connect all the wavelengths. Opto-mechanical switches, which offer acceptable optical specifications are too big, expensive and unreliable for widespread deployment. Improvements are needed to help reliably switch and direct the various wavelengths along, their desired paths.

Micro-electrical-mechanical systems (MEMS) theoretically provide small systems capable of providing switching functions. However, MEMS also have difficulties to overcome. For example, voltages needed to rotate the micromirror often are larger than desired, resulting in distortion of the mirror shape. The present invention is, therefore, directed to improved MEMS devices for use with a wide range of OTN equipment, including switches (OXC) and routers.

SUMMARY OF THE INVENTION

The present invention provides improved MEMS devices for use with all optical networks, and methods of using and making same. For example, the present invention may be used with the exemplary wavelength routers described in U.S. patent application Ser. No. 09/442,061, filed Nov. 16, 1999, issued as U.S. Pat. No. 6,501.877, the complete disclosure of which is incorporated herein by reference.

In one embodiment, a structure for steering light is provided. The structure includes a base layer, a first conductive layer overlying a portion of the base layer, and a flexure assembly overlying a portion of the first conductive layer. A portion of the flexure assembly has an I-beam configuration. The beam layer overlies and is coupled to the flexure assembly, and is adapted to rotate relative to the base layer.

In one aspect, a second conductive layer overlies a portion of the first conductive layer, with the first conductive layer having a greater surface area than the second conductive layer. In another similar aspect, the device includes a third conductive layer overlying a portion of the second conductive layer, with the second conductive layer having a greater surface area than the third conductive layer In one embodiment, a portion of underlying edges of the flexure assembly and beam layer are adapted to contact the base layer upon rotation of the beam layer. In this manner, the beam layer is rotated by an underlying rotation device. Further, the multi-point contact between the underlying edges and the base layer provides a stable platform for the beam layer.

In some embodiments, the base layer includes a non-conductive material, the beam layer comprises an electrically conductive material, and/or the conductive layer(s) include polysilicon. In one aspect, the beam layer is electrically isolated from the conductive layers.

In one aspect, the flexure assembly includes a torsion beam having first and second generally parallel arms each coupled to a central beam that is generally orthogonal to the arms. In another aspect, the arms also are coupled to the beam layer to provide support thereto.

In one aspect, the first and second conductive layers each have a central portion separate from remaining portions of the respective conductive layers. The central portions are coupled together. In another aspect, the flexure assembly includes a central portion that is coupled to the second conductive layer central portion. In this manner, the central portions help facilitate rotation of the flexure assembly, and help electrically isolate the beam layer from the remaining portions of the first and second conductive layers.

In one aspect, the first, second and third conductive layers are in separate planes. In another aspect, the first, second and third conductive layers have at least portions thereof electrically coupled together, with the electrically coupled portions adapted to operate together as a single electrode.

In one particular aspect, the underlying edges of the flexure assembly and beam layer are configured to simultaneously contact the base layer upon rotation of the beam layer. In this manner, the underlying edges of two or more layers provide a stable multi-point landing system for the beam layer. Further, the beam layer preferably has a substantially planar upper surface when the underlying edges are in contact with the base layer.

In one embodiment, an apparatus for steering light according to the present invention includes a base layer, a first conductive layer overlying the base layer, and a second conductive layer. Each of the first and second conductive layers are in a separate plane from the other, and each conductive layer includes at least a portion thereof that is electrically coupled to at least a portion of the other conductive layer. A beam layer is coupled to a rotation device, with the rotation device positioned between at least one of the conductive layers and the beam layer. The rotation device and beam layer rotate in response to a voltage applied to the coupled portions of the conductive layers. In this manner, the conductive layers together are used to rotate the beam layer. Due at least in part to the positioning of the conductive layers, a lower threshold voltage is used to rotate the beam layer as compared to using a single conductive layer.

In one aspect, the present invention further includes a third conductive layer, with each of said first, second and third conductive layers in a separate plane from the other two conductive layers, and each having at least a portion thereof that is electrically coupled to at least a portion of the other two conductive layers.

In one aspect, an underlying edge of the beam layer is adapted to contact the base layer at a first location when a first voltage is applied to the electrically coupled conductive layer portions, and to contact the base layer at a second location when a second voltage is applied. In another aspect, the rotation device includes a torsion beam underlying the beam layer and having at least a portion thereof comprising an I-beam.

The present invention further provides exemplary methods for making an apparatus for steering light. In one embodiment, the method includes providing a base layer having first and second portions. First and second stacked electrodes are formed on the first and second portions, with the stacked electrodes on the first portion electrically isolated from the stacked electrodes on the second portion. A flexure assembly is formed coupled to the base layer and electrically isolated from the first and second stacked electrodes. A beam layer is coupled to the flexure assembly. The flexure assembly and stacked electrodes may have some or all of the characteristics described above.

In one aspect, the method further includes formed a third stacked electrode overlying the second stacked electrode. In one embodiment, each subsequently formed electrode has about the same surface area, or a smaller surface area, than the immediately underlying electrode.

The present invention further provides methods for steering light. In one embodiment, a structure for steering light as previously described is provided. A voltage is applied to the first and second conductive layers to rotate the beam layer to a desired position. The beam layer has a substantially planar upper surface when in the desired position. The method includes directing a light at the beam layer.

Other objects, features and advantages of the present invention will become more fully apparent from the following detailed description, the appended claims and the accompanying drawings.

DESCRIPTION OF THE SPECIFIC EMBODIMENTS

The general functionality of a wavelength router is to accept light having a plurality of spectral bands (i.e., "N" spectral bands) at an input port, and selectively direct subsets of the spectral bands to desired ones of a plurality of output ports (i.e., "M" output ports). The routers may include dynamic switching where the routing mechanism includes one or more routing elements whose state can be dynamically changed in the field to effect switching. The routers may also include static embodiments in which the routing elements are configured at the time of manufacture or under circumstances where the configuration is intended to remain unchanged during prolonged periods of normal operation.

The routers may include a dispersive element, such as a diffraction grating or a prism, which operates to deflect incoming light by a wavelength-dependent amount. Different portions of the deflected light are intercepted by different routing elements. Although the incoming light could have a continuous spectrum, adjacent segments of which could be considered different spectral bands, it is generally contemplated that the spectrum of the incoming light will have a plurality of spaced bands.

The terms "input port" and "output port" are intended to have broad meanings. At the broadest, a port is defined by a point where light enters or leaves the system. For example, the input (or output) port could be the location of a light source (or detector) or the location of the downstream end of an input fiber (or the upstream end of an output fiber). In specific embodiments, the structure at the port location could include a fiber connector to receive the fiber, or could include the end of a fiber pigtail, the other end of which is connected to outside components. In many cases, light will diverge as it enters the wavelength router after passing through the input port, and will converge within the wavelength router as it approaches the output port. However, this is not necessary.

The International Telecommunications Union (ITU) has defined a standard wavelength grid having a frequency band centered at 193,100 GHz, and another band at every 100 GHz interval around 193,100 GHz. This corresponds to a wavelength spacing of approximately 0.8 nm around a center wavelength of approximately 1550 nm, it being understood that the grid is uniform in frequency and only approximately uniform in wavelength. Embodiments of the invention are preferably designed for the ITU grid, but finer frequency intervals of 25 GHz and 50 GHz (corresponding to wavelength spacings of approximately 0.2 nm and 0.4 nm) are also of interest.

Figure 1A:
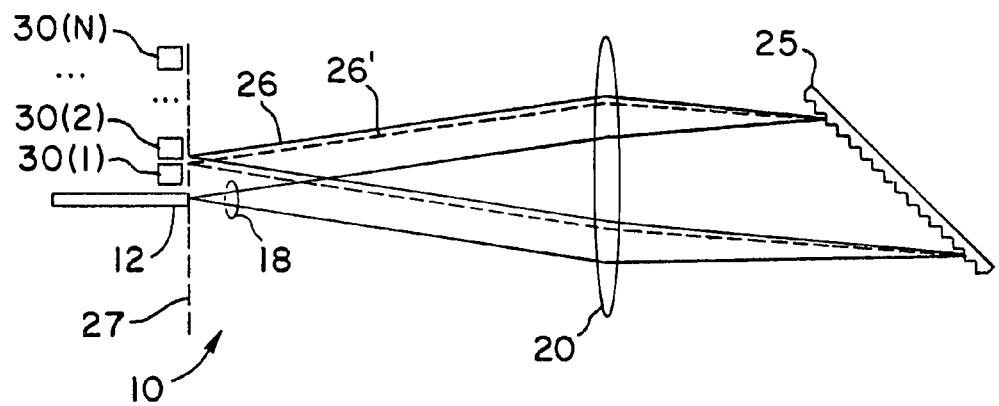
FIGS. 1A, 1B and 1C are schematic top, side and end views, respectively, of a wavelength router for use with an embodiment of the invention.
Figure 1B:
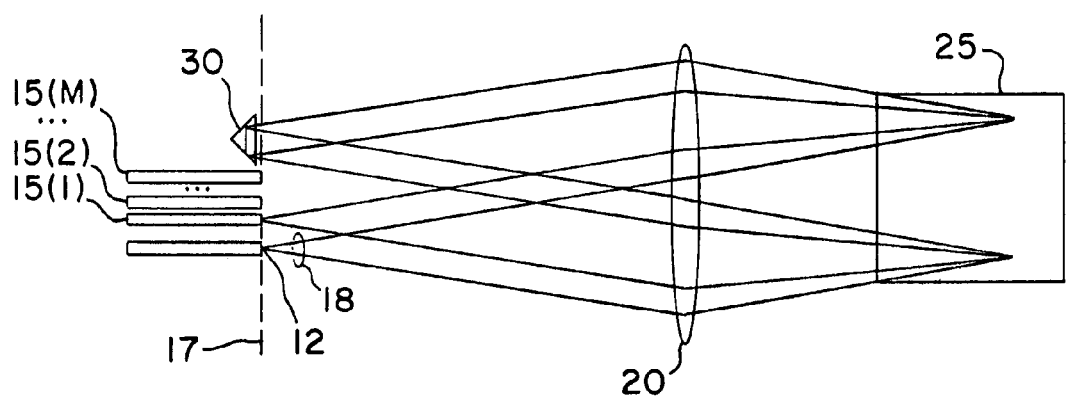
Figure 1C:
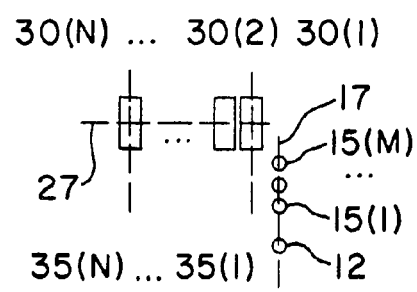

One particular embodiment of a wavelength router 10 is illustrated in FIGS. 1A, 1B and 1C. This embodiment is included to illustrate the basic principles of operation of one type of wavelength router as described generally in U.S. Pat. No. 6,501,877, previously incorporated by reference. However, the invention is not intended to be limited only to such an embodiment.

FIGS. 1A, 1B, and 1C are schematic top, side, and end views, respectively, of a wavelength router 10. The general functionality of wavelength router 10 is to accept light having a plurality of spectral bands at an input port 12, and selectively direct subsets of the spectral bands to desired ones of a plurality of output ports, designated 15(1 . . . M). The output ports are shown in the end view of FIG. 1C as disposed along a line 17 that extends generally perpendicular to the top view of FIG. 1A. The input and output ports are shown as communicating with respective input and output optical fibers, but it should be understood that the input port could also receive light directly from a light source, and the output ports could be coupled directly to optical detectors. The drawing is not to scale.

Light entering wavelength router 10 from input port 12 forms a diverging beam 18, which includes the different spectral bands. Beam 18 encounters a lens 20 which collimates the light and directs it to a reflective diffraction grating 25. Grating 25 disperses the light so that collimated beams at different wavelengths are directed at different angles back towards lens 20. Two such beams are shown explicitly and denoted 26 and 26 (the latter drawn in dashed lines). Since these collimated beams encounter the lens at different angles, they are focused at different points along a line 27 in a transverse focal plane. Line 27 extends in the plane of the top view of FIG. 1A.

The focused beams encounter respective ones of plurality of retroreflectors, designated 30(1 . . . N), located near the focal plane. The beams are directed, as diverging beams, back to lens 20. Each retroreflector sends its intercepted beam along a reverse path that may be displaced in a direction perpendicular to line 27. More specifically, the beams are displaced along respective lines 35(1 . . . N) that extend generally parallel to line 17 in the plane of the side view of FIG. 1B and the end view of FIG. 1C.

In one particular embodiment shown, the displacement of each beam is effected by moving the position of the retroreflector along its respective line 35(i). In other embodiments, to be described below, the beam displacement is effected by a reconfiguration of the retroreflector. It is noted that the retroreflectors are shown above the output ports in the plane of FIG. 1C, but this is not necessary; other relative positions may occur for different orientations of the grating or other elements.

The beams returning from the retroreflectors are collimated by lens 20 and directed once more to grating 25. Grating 25, on the second encounter, removes the angular separation between the different beams, and directs the collimated beams back to lens 20, which focuses the beams. However, due to the possible displacement of each beam by its respective retroreflector, the beams will be focused at possibly different points along line 17. Thus, depending on the positions of the retroreflectors, each beam is directed to one or another of output ports 15(1 . . . M).

In sum, each spectral band is collimated, encounters the grating and leaves the grating at a wavelength-dependent angle, is focused on its respective retroreflector such that is displaced by a desired amount determined by the retroreflector, is collimated again, encounters the grating again so that the grating undoes the previous dispersion, and is focused on the output port that corresponds to the displacement imposed by the retroreflector. In the embodiment described above, the light traverses the region between the ports and the grating four times, twice in each direction.

Turning now to FIGS. 2 and 3A–3C an exemplary apparatus for steering light according to the present invention will be described. Apparatus 100 may be used as retroreflectors 30 in the router depicted in FIG. 1. Apparatus 100 also may be used as part of optical switches, display devices, signal modulators and the like.

Figure 2:
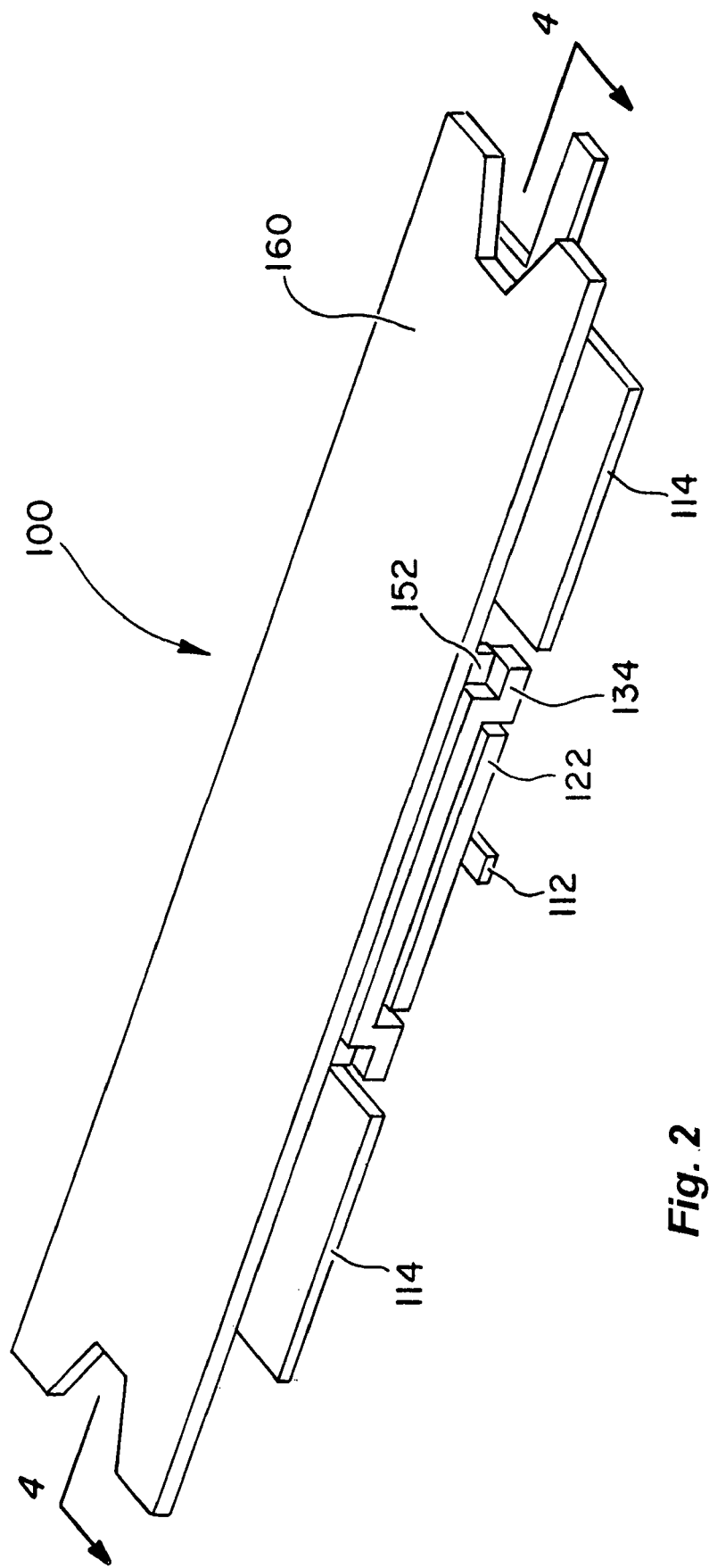
FIG. 2 is a simplified overall view of a light steering apparatus according to the present invention.

Apparatus 100 includes a beam layer 160 as shown in FIG. 2. Beam layer 160 is used to reflect light in optical switches, optical routers, and the like. Preferably, beam layer 160 includes a reflective surface and is made from a wide range of materials depending, in part, on the particular application. In one embodiment, beam layer 160 comprises gold, silver, chromium, aluminum, combinations thereof, and the like. In another embodiment, beam layer 160 comprises polysilicon. Apparatus 100 makes use of a multi-layer electrode stack underlying beam layer 160 to facilitate rotation of beam layer 160 into a desired position. Use of electrode configurations according to the present invention help reduce the threshold voltage needed to rotate beam layer 160.

Figures 3A, 3B:
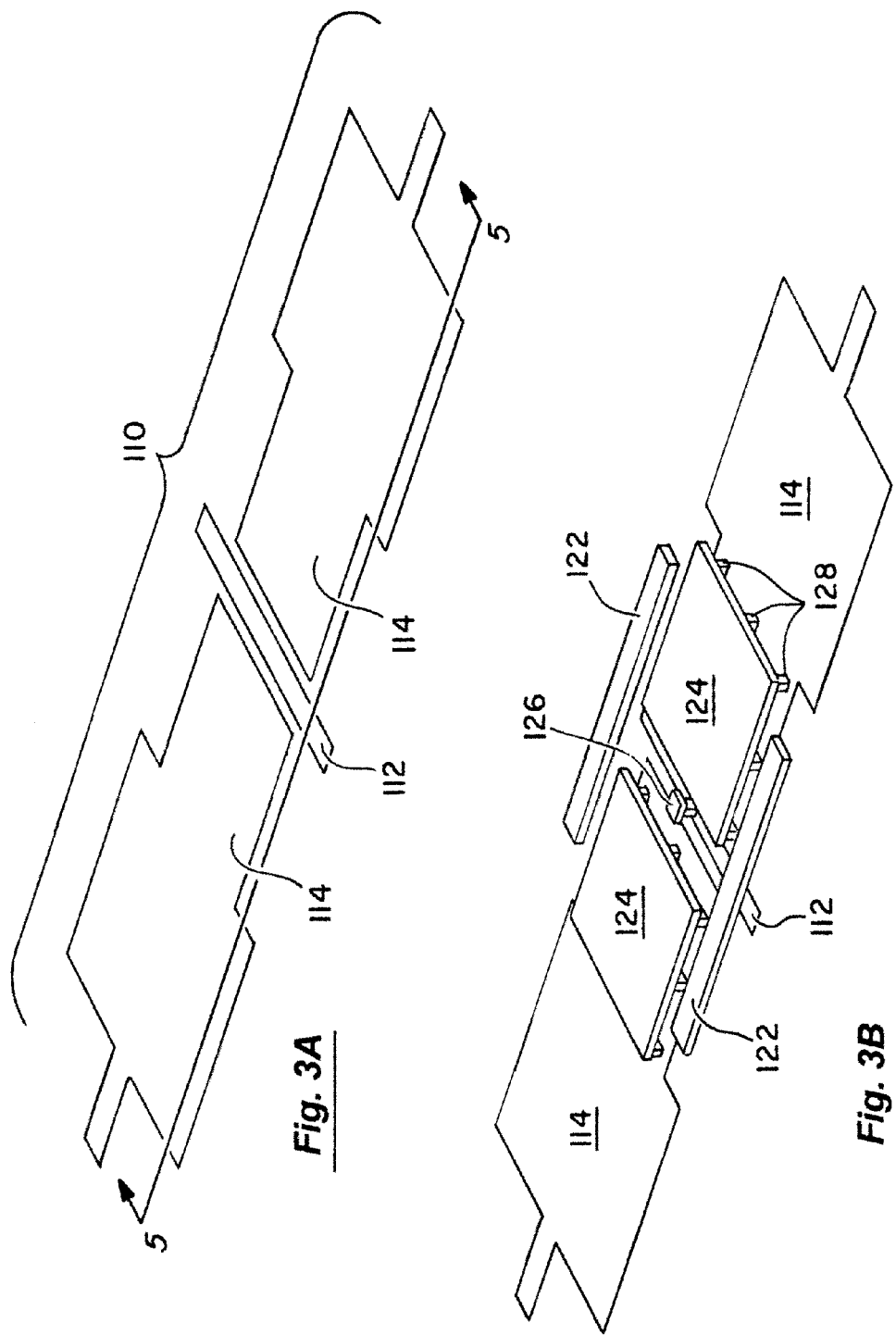
FIGS. 3A–3C are overall views of various layers of the apparatus of FIG. 2.

As best shown in FIG. 3A, apparatus 100 includes a first conductive layer 110 formed over a base layer 116 (not shown in FIGS. 2 and 3). First conductive layer 110 includes a central portion 112 and two electrode plate portions 114. Central portion 112 is physically and electrically isolated from plate portions 114. In one embodiment, central portion 112 and plate portions 114 have thickness between about 0.2 microns (μm) and about 0.5 microns, although the size will depend on a number of factors, and may be outside this range.

As shown in FIG. 3B, second electrode plate portions 124 are formed overlying at least a portion of electrode plate portions 114. Plate portions 124 are physically and electrically coupled to plate portions 114 by a plurality of supports 128. Supports 128 may comprise one or more posts, bars and the like. In one embodiment, plate portions 114 and 124 comprise polysilicon, although metals and other materials may be used within the scope of the present invention. First and second bar portions 122 are formed overlying part of central portion 112. Bar portions 122 are electrically isolated from plate portions 124, however, bar portions 122 may comprise the same material as plate portions 124. An anchor 126 is formed between plate portions 124 and contacts the underlying central portion 112. Anchor 126 operates to anchor an overlying portion of a flexure assembly to base layer 116. As will be described in conjunction with later figures, anchor 126 and bar portions 122 are used to facilitate rotation of beam layer 160. Bar portions 122, plate portions 124 and anchor 126, in one embodiment, are all made from a second conductive layer 120.

Figure 3C:
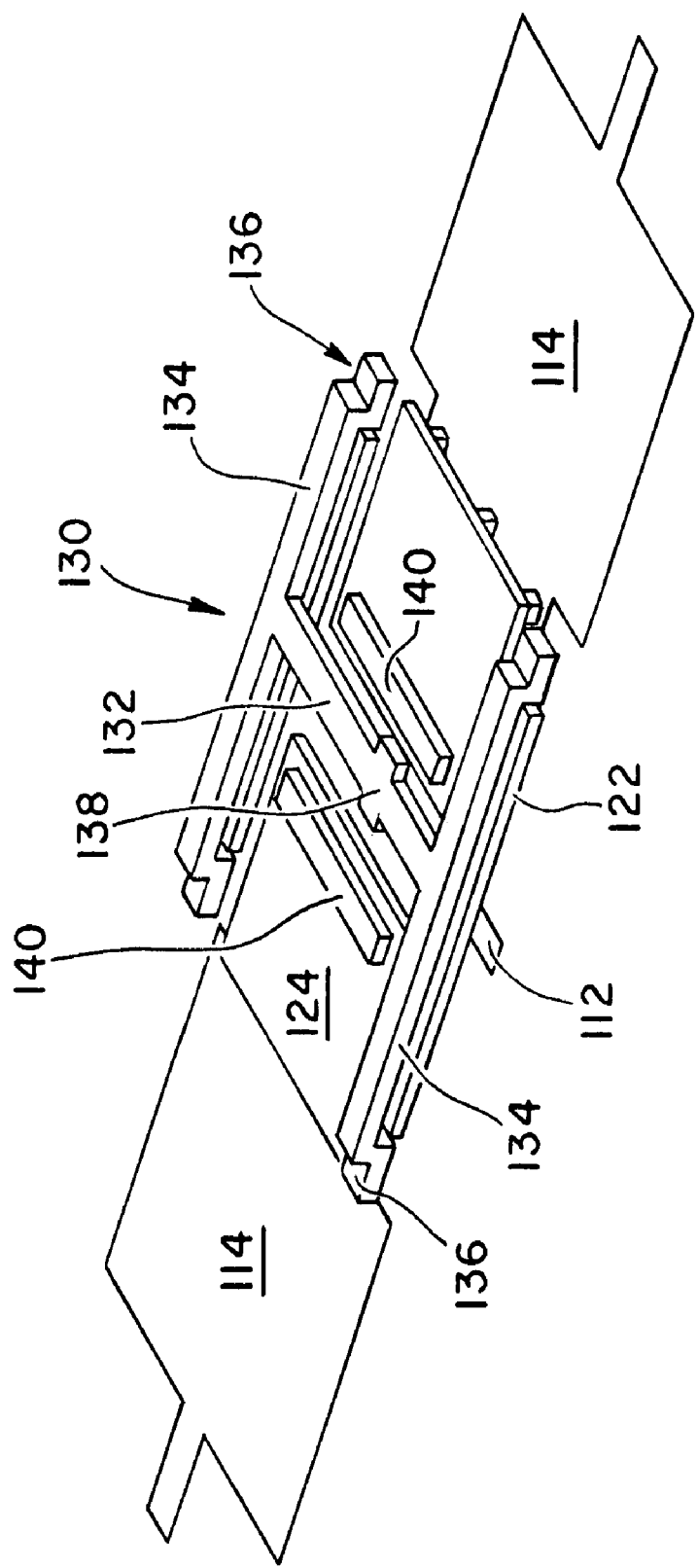

As shown in FIG. 3C, a rotation device 130 is formed at least partially overlying the previously described structure. In one embodiment, and as shown in FIG. 3C, rotation device 130 comprises a torsion beam 130. Torsion beam 130 includes a central beam 132 having a central portion 138. Beam 132 is coupled to first and second arms 134. In an alternative embodiment, torsion beam 130 comprises a torsion plate (not shown) in place of arms 134 and central portion 138. The torsion plate is suspended above electrode plate portions 114, 124 and is adapted to rotated relative thereto.

In another embodiment, rotation device 130 is formed in conjunction with second conductive layer 120. In this manner, rotation device 130 rotates relative to plate portions 114.

As shown in FIG. 3C, central beam 132 is positioned generally orthogonal to arms 134, although other configurations may be used within the scope of the present invention. Arms 134 are generally parallel to one another in one embodiment. In another embodiment, arms 134 extend substantially over bar portions 122, although they need not, and in still another embodiment are coupled to bar portions 122. In one embodiment (not shown), arms 134 are the same length, or shorter in length than bar portions 122. Arms 134 further may, but need not include a notch 136, shown positioned at both ends of both arms 134. In an embodiment, notches 136 facilitate the coupling of beam layer 160 (not shown in FIG. 3C) to rotation device 130.

In one embodiment, bar portions 122, anchor 126 and rotation device 130 collectively define a flexure assembly adapted to rotate an overlying beam layer 160 relative to the base layer 116.

Third electrode plates 140, in one embodiment, overlie second electrode plates 124. Third electrode plates 140 may comprise the same materials as, and may be formed coincidentally with rotation device 130. However, as depicted in FIG. 3C, electrodes 140 are electrically isolated from rotation device 130. Hence, electrode plate portions 114, 124 and 140 are electrically coupled together. In one embodiment, the surface area of electrode plate portion 114 is greater than the surface area of electrode plate portion 124. In turn, in one embodiment electrode plate portion 124 has a greater surface area than that of third electrode plate 140. In this manner, a stacked electrode configuration is provided, with electrodes closer to the beam layer being generally the same size or smaller than underlying electrodes. Beam layer 160 is thereafter formed overlying the structure shown in FIG. 3C, such that beam layer 160 is coupled to torsion beam 130. In one embodiment, beam layer 160 is coupled to torsion beam 130 at notches 136, for example, by forming connectors that connect notch 136 with an undersurface of beam layer 160. Additional embodiments include forming notches 136 at different locations along torsion beam 130 than depicted. In an alternative embodiment, beam layer 160 is further coupled to central beam 132.

Preferably, at least a portion of beam layer 160 comprises an electrically conductive material. Hence, beam layer 160 is electrically coupled to rotation device 130 and the central portions or anchors of the underlying conductive layers 112 and 126. In one embodiment, central portion 138 of the torsion beam structure is coupled to anchor 126. Further, the coupled central portions/anchors and beam layer 160 are electrically isolated from electrode plate portions 114, 124 and 140. Hence, the application of a voltage to the electrically coupled plates facilitates rotation of the overlying beam layer 160 as further described in conjunction with subsequent figures.

Figure 4A:
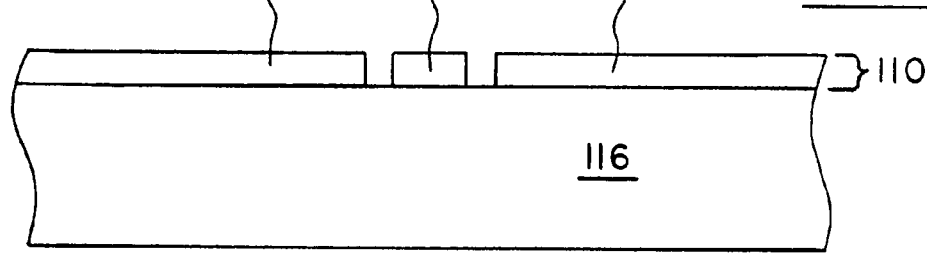
FIGS. 4A–4D depict a method of manufacturing steering apparatus according to the present invention, taken along the apparatus centerline shown in FIG. 2.

Turning now to FIGS. 4A–4D, a method of manufacturing light steering apparatus according to the present invention will be described. As shown in FIG. 4A, first conductive layer 110 is formed over base layer 116. First conductive layer 110 and base layer 116 are electrically isolated. Base layer 116 may comprise nitride, such as silicon nitride, and the like. In one embodiment, base layer 116 comprises a substrate, such as a silicon substrate, overlaid with an oxide layer, such as a thermal oxide layer, over which is laid a layer of silicon nitride (together shown as base layer 116 in the Figures). First conductive layer 110 may comprise polysilicon, metals or other conductive materials. In one embodiment, first conductive layer 110 is formed using a chemical vapor disposition (CVD) process. The thickness of first conductive layer 110 may vary within the scope of the present invention, and in one embodiment is about 0.3 microns, and in another embodiment is between about 0.3 and about 1.0 microns.

After formation, conductive layer 110 is patterned to form central portion 112 and electrode plate portions 114. Central portion 112 and plate portions 114 may be formed by micromachining, photolithography and etching processes, and the like. In one embodiment, a photoresist pattern is formed overlying first conductive layer 110 having openings therethrough to expose the portions of first conductive layer 110 that lie between the to be formed central portion 112 and plate portions 114. An etch process then removes portions of first conductive layer 110 to create electrically isolated central portion 112 and electrode plate portions 114.

Figure 4B:
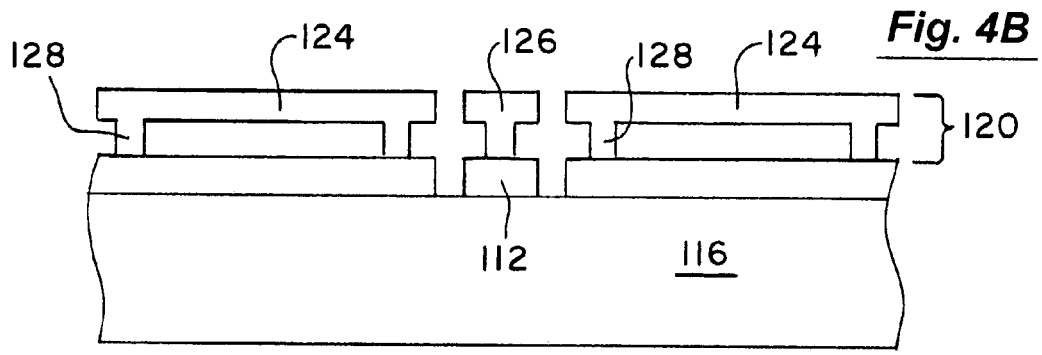

As shown in FIG. 4B, a second conductive layer 120 is formed from which second electrode plate portions 124 and anchor 126 are formed. In one embodiment, a non-conductive layer (not shown) is formed prior to the formation of second conductive layer 120. The non-conductive layer (not shown) may comprise an oxide, such as silicon dioxide, and may be formed by thermal oxidation, CVD, or other processes. Subsequent to formation of the non-conductive layer, vias or trenches are formed in the oxide layer. Thereafter, second conductive layer 120 is formed such that the conductive material substantially fills the vias, thereby forming supports 128 as shown in FIG. 4B. Again, second conductive layer 120 may be formed using a CVD process or the like. The non-conductive layer and second conductive layer 120 also may have a wide range of thickness within the scope of the present invention. In one embodiment, the non-conductive layer is about 2.0 microns thick and second conductive layer 120 is about 1.0 microns thick. Similarly, supports 128 are about 2.0 microns in length. As shown in FIG. 4B, central portion 112 and anchor 126 are coupled together and are electrically isolated from electrode plate portions 114 and 124.

Figure 4C:
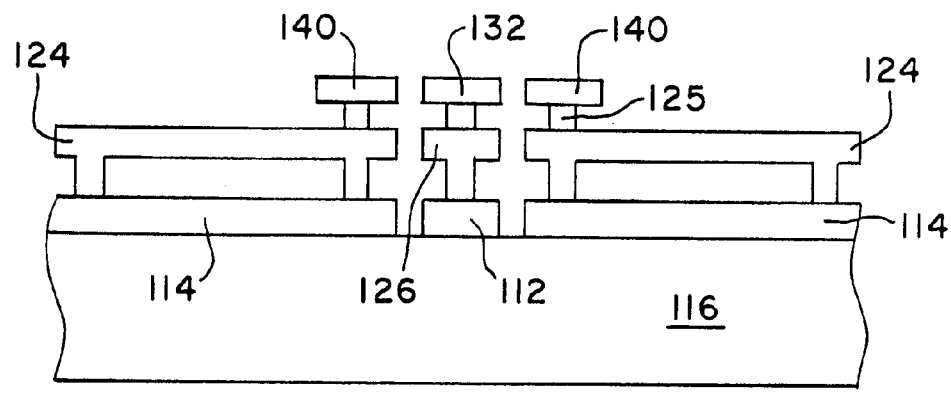

Turning now to FIG. 4C, a second non-conductive layer (not shown) is formed, such as by deposition or thermal oxidation, over second electrode plate portion 124 and anchor 126. Second non-conductive layer then is patterned to form a via or vias to the underlying plate portion 124 and anchor 126. A third conductive layer then is preferably formed overlying the second non-conductive layer. A portion of the third conductive layer fills the via(s) in second non-conductive layer to create conductive posts 125. In one embodiment, third conductive layer is about 1.5 microns thick. The third conductive layer is again patterned to form third electrode plate portions 140 and the central beam 132 as shown in FIG. 4C. Again, central beam 132 makes up a portion of the rotation device 130 discussed in prior Figures. Further, central beam 132 is coupled to central portion 112 and anchor 126.

Figure 4D:
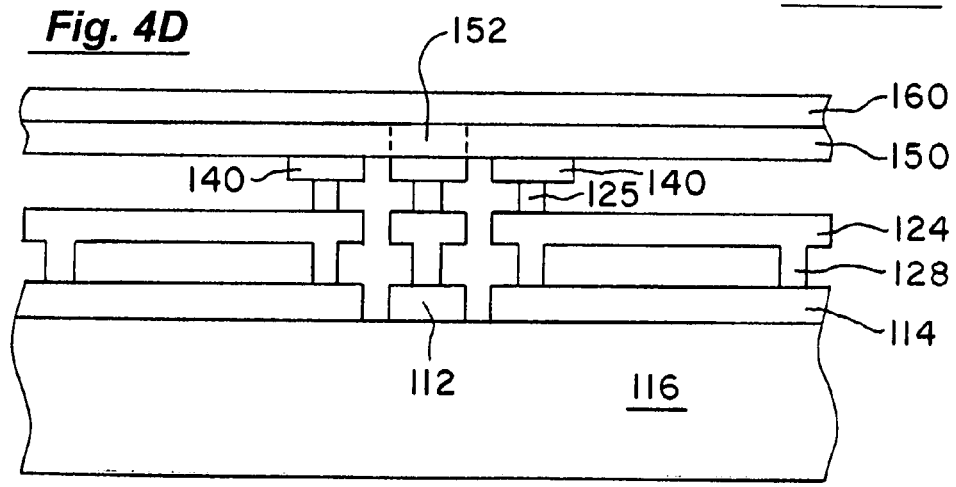

As shown in FIG. 4D, a non-conductive layer 150 is formed over-lying electrode plate portions 140 and central beam 132. In one embodiment, non-conductive layer 150 is about 1.5 microns thick. Again, non-conductive layer 150 may comprise an oxide or other non-conductive or isolation materials. After formation, a planarization process may be performed on non-conductive layer 150. A via or trench is formed in non-conductive layer 150, which in one embodiment exposes a portion of the underlying central beam 132. Beam layer 160 is thereafter formed overlying non-conductive layer 150. Beam layer 160, in one embodiment, comprises polysilicon, and in another embodiment is about 2.25 microns thick. In one embodiment, beam layer 160 fills the via or trench in non-conductive layer 150 to create connectors 152 coupling beam layer 160 to central beam 132. In one embodiment, connectors 152 couple the notch portion 136 of first and second arms 134 to the underside of beam layer 160. The remaining portions of non-conductive layer 150 are removed to electrically isolate beam layer 160 from third plate electrode 140.

In one embodiment, prior to beam layer 160 formation, the uppermost layers of apparatus 100 are planarized. Planarization may take place using a chemical mechanical polishing (CMP), flip-chip assembly, planarized-by-design (PBD), or other techniques. In one embodiment, beam layer 160 is a single crystal silicon.

Figure 5A:
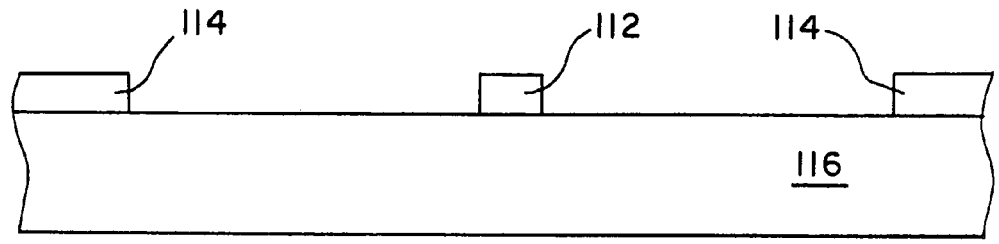
FIGS. 5A–5C depict the method of FIGS. 4A–4D, showing the torsion beam structure along line 5—5 in FIG. 3A.
Figure 5B:
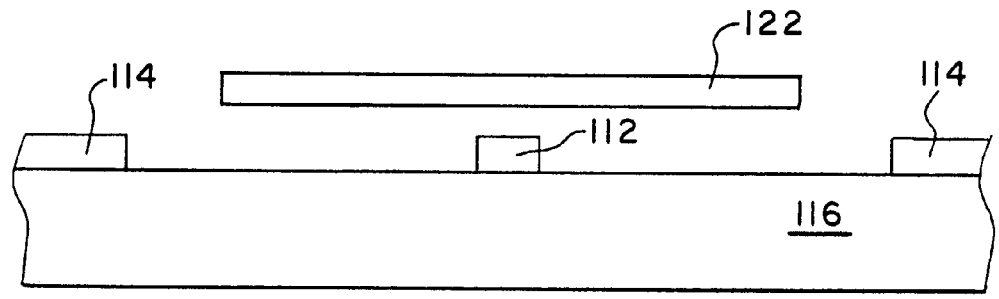
Figure 5C:
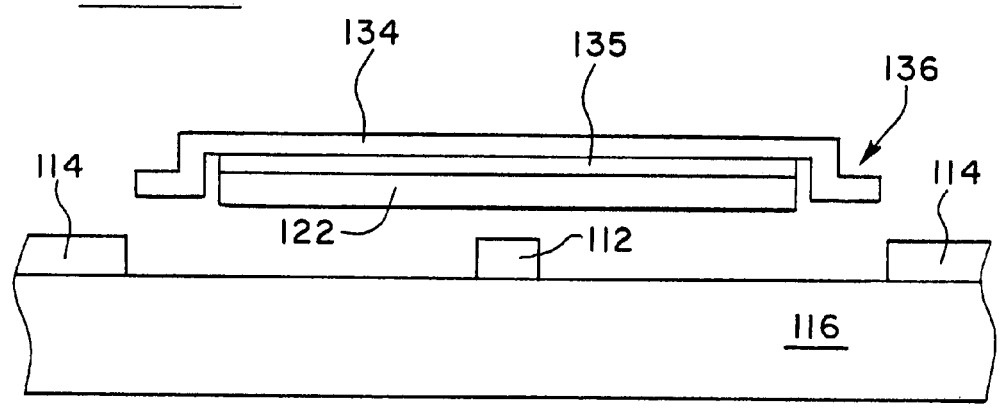

FIGS. 5A–5C provide further detail of the torsion beam structure as taken along line 5—5 in FIG. 3A. FIG. 5A shows the separation between electrode plate portions 114 and central portion 112. Thereafter, bar portions 122 are formed from second conductive layer 120. As shown in FIGS. 5B–5C, in one embodiment the non-conductive layer formed prior to formation of second conductive layer 120 produces a separation between bar portion 122 and central portion 112. Thereafter, second non-conductive layer is formed and a via or trench is patterned above bar portion 122. In one embodiment, the via or trench runs substantially the length of bar portion 122. As described in conjunction with FIG. 4C, a third conductive layer is formed. Third conductive layer substantially fills the via or trench in second non-conductive layer with a plug 135, and further forms arms 134. The remaining portions of the second non-conductive layer are removed.

Figure 5D:
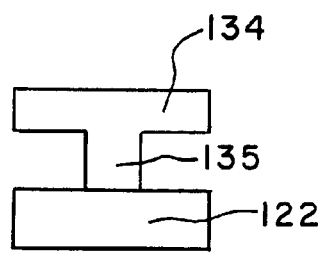
FIG. 5D is a cross sectional view of the torsion beam stricture of FIG. 5C.

FIG. 5D is a cross sectional view of the torsion beam structure of FIG. 5C, showing bar portion 122, plug 135 and arm 134. The I-beam configuration shown in FIG. 5D facilitates rotation of the torsion beam, and provides the desired electrical conductive path and support to the overlying beam layer 160.

Figure 6:
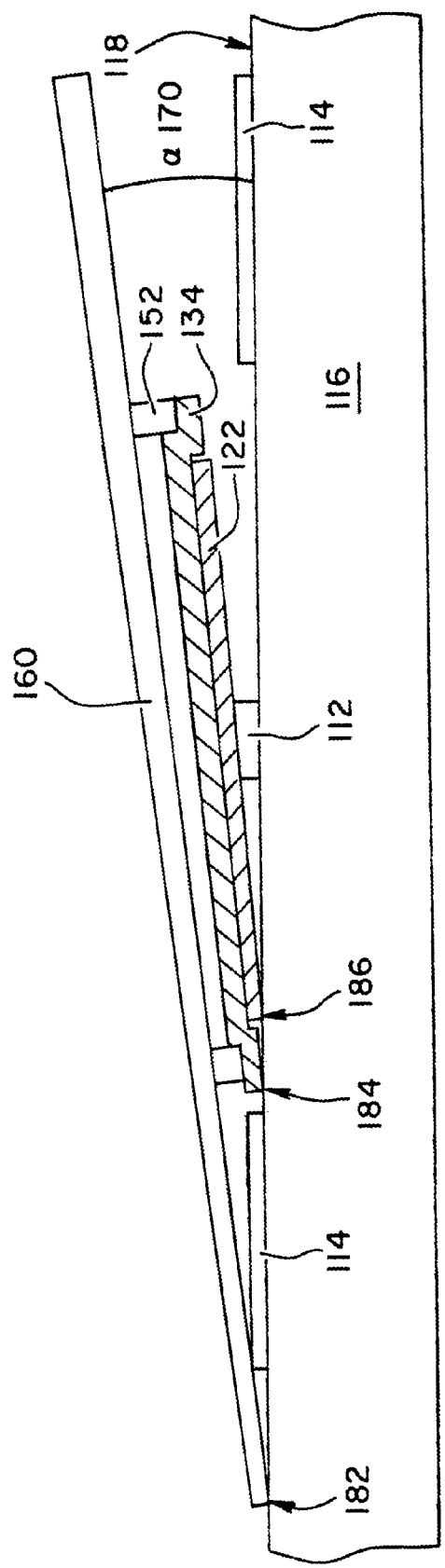
FIG. 6 is a simplified side view of the steering apparatus of FIG. 2.

FIG. 6 depicts a side view of apparatus 100 according to the present invention. A method of steering light according to embodiments of the present invention will be described in conjunction with FIG. 6. As shown therein, beam layer 160 is capable of rotating through an angle 170. Angle 170, in one embodiment, is about five degrees (5°). In alternative embodiments, angle 170 ranges between about zero degrees (0°) to about fifteen degrees (15°), although other ranges of rotation are within the scope of the present invention. The rotation of beam layer 160 is caused by applying a voltage to the stacked electrode plate portions 114, 124 and 140 (plate portions 124 and 140 not shown in FIG. 6). Beam layer 160, comprising an electrically conductive material, is ground to central portions 112 and 138, and anchor 126. As previously discussed, the electrode plate portions 114, 124 and 140 are electrically coupled for providing the use of a lower threshold voltage. In other words, the stack electrode configuration, with each electrode in a substantially different plane in one embodiment, facilitates rotation of beam layer 160 with a lower voltage.

In another embodiment, apparatus 100 does not have plate portion 140, and hence the voltage is applied to stacked plate portions 114 and 124. In still another embodiment, apparatus 100 does not have plate portions 124, and hence the voltage is applied to plate portions 114. In this embodiment, second conductive layer 120 may be used to form rotation device 130 in lieu of plate portions 124.

When the voltage is applied to the left most stacked electrodes as shown in FIG. 6, the beam layer 160 rotates as depicted in FIG. 6. The applied voltage, in alternative embodiments, is between about 30 volts (V) and about 250 volts, or between about 30 volts and about 150 volts. Similarly, by removing the voltage from the stacked electrode plate portions 114, 124 and 140 will cause beam layer 160 to rotate to a configuration that is substantially parallel to an upper surface 118 of base layer 160. Further, when a voltage is applied to the right most stacked electrodes plates 114, 124 and 140 (as shown in FIG. 6), beam layer 160 will rotate such that the right most portion of beam layer 160 as shown in FIG. 6 contacts base layer 116. Again, base layer 116 may comprise one layer or multiple layers, and is depicted as a single layer for convenience of illustration. Hence, rotational movement is preferably bi-directional with rotation ranging from about ±2 degrees to about ±15 degrees, or more. Additionally, rotation to the right or left as show in FIG. 6 may be continuous. In this manner, the electrode stack need not snap down to the position shown in FIG. 6.

In one embodiment, the electrode stack configuration reduces the voltage requirement by up to about 50% compared to using only electrode plate portion 114. In another embodiment, the voltage requirement is reduced by about twenty (20) percent to about thirty (30) percent.

In addition to operating at a lower threshold voltage than devices having only electrode plate portions 114, apparatus of the present invention provide a stable landing platform for beam layer 160. As shown in FIG. 6, an underlying edge 182 of beam layer 160 contacts upper surface 118 of base layer 116. Similarly, an underlying edge 184 of first and second arms 134, and an underlying edge 186 of first and second bar portions 122 are configured to contact upper surface 118. In one embodiment, underlying edges 182–186 are configured to contact upper surface 118 simultaneously. In this manner, a six-point landing system is provided for stabilization of beam layer 160 upon rotation. As a result, beam layer 160 has a substantially planar upper surface when in an activated position (as shown in FIG. 6).

It will be appreciated by those skilled in the art that the six-point landing system discussed above may vary within the scope of the present invention. For example, in one embodiment, only underlying edge 186 of first and second bar portions 122 contacts upper surface 118. Similarly, in another embodiment, only underlying edge 184 contacts upper surface 188. Other landing platforms are provided by other combinations of underlying edges contacting upper surface 118.

In still another embodiment, underlying edges of beam layer 160 and/or the flexure assembly contact a portion of first conductive layer 110 that is at the same electrical potential as beam layer 160. For example, after formation of the first conductive layer 110, a landing pad portion of conductive layer 110 may be electrically isolated from the remaining portions of first conductive layer 110 that make up electrode plate portions 114. The electrically isolated landing pad portion may be defined, for example, by creating one or more vias and filling the vias with a dielectric material. In this manner, the landing pad portions may operate having the same electrical potential or ground as beam layer 160.

The present invention is an improvement over prior-art devices which do not provide sufficient support to beam layer 160. Absent sufficient support, beam layer 160 may bow downwards toward base layer 116 producing a concave upper surface of beam layer 160. This bowing effect is due in part to the use of higher activation voltages, and insufficient support for the beam layer. Further, apparatus 100 according to the present invention use rotation devices or flexure assemblies, which may include an I-beam that underlie beam layer 160. As a result, beam layer 160 presents substantially all of its surface to the light, thereby providing enhanced reflective qualities.

The invention has now been described in detail for purposes of clarity and understanding. However, it will be appreciated that certain changes and modifications may be practiced within the scope of the appended claims. For example, while FIGS. 2–6 generally describe a single apparatus 100, the present invention further anticipates the formation of more than one apparatus 100. For example, an array of apparatus 100 may be formed on the same base layer 116 or different base layers 116. The array, which may or may not be symmetrical in number, may contain tens, hundreds and even thousands of apparatus 100.

What is claimed is:

1. A structure comprising:
   a base;
   a first conductive layer overlying a portion of said base;
   a flexure assembly operably coupled to the base; and
   a beam layer overlying and coupled to said flexure assembly, said beam layer adapted to rotate relative to said base,
   wherein a portion of underlying edges of said flexure assembly are adapted to contact said base upon rotation of said beam layer.

2. The structure of claim 1 wherein said flexure assembly comprises a torsion beam having first and second generally parallel arms each coupled to a central beam that is generally orthogonal to said first and second arms.

3. The structure of claim 2 wherein said first and second arms are coupled to said beam layer.

4. The structure of claim 1 wherein a portion of underlying edges of said beam layer are configured to contact said base upon rotation of said beam layer.

5. The structure of claim 1 wherein said beam layer comprises a substantially planar surface when said portion of underlying edges of the flexure assembly are in contact with said base.

6. The structure as in claim 1 wherein the beam layer is adapted to reflect light.

7. The structure as in claim 1 wherein a portion of the flexure assembly comprises an I-beam.

8. A structure comprising:
   a base;
   a conductive element overlying a portion of the base;
   a beam layer spaced apart from the base and coupled to a rotation device, the rotation device disposed between the beam layer and the base, the rotation device adapted to permit rotation of the beam layer relative to the base, and the rotation device adapted to maintain a substantially planar beam layer surfaces,
   wherein a portion of an edge of the rotation device is adapted to contact the base upon rotation of the beam layer.

9. The structure as in claim 8 wherein the conductive element comprises a stacked conductive element have a thinner portion and a thicker portion, the thicker portion disposed closer to a beam layer axis of rotation than is the thinner portion.

10. The structure as in claim 9 wherein a voltage applied to the conductive element to rotate the beam layer is less than a voltage needed to rotate the beam layer if the conductive element was uniformly as thick as the thinner portion.

11. The structure as in claim 8 wherein the conductive element comprises at least two conductive layers having different areas.

12. The structure as in claim 8 wherein the conductive element comprises a step-shaped conductive element.

13. The structure as in claim 8 wherein a portion of an edge of the beam layer is adapted to contact the base upon rotation of the beam layer.

14. The structure as in claim 8 wherein the rotation device is adapted to rotate when a voltage differential is applied between the conductive element and the beam layer.

15. The structure as in claim 8 further comprising a second conductive element positioned to provide a different directional rotation of the beam layer.

16. A method of steering light, the method comprising:
   providing a structure for steering light, the structure comprising;
   a base;
   a conductive element overlying a portion of the base; and
   a beam layer spaced apart from the base and coupled to a rotation device, the rotation device disposed between the beam layer and the base, the rotation device adapted to permit rotation of the beam layer relative to the base, and the rotation device adapted to maintain a substantially planar beam layer surface,
   wherein a portion of an edge of the rotation device is adapted to contact the base upon rotation of the beam layer;
   applying a voltage to the conductive element to cause the beam layer to rotate to a desired position, the rotation device maintaining a substantially planar beam layer surface when the beam layer is in the desired position; and
   directing a light at the beam layer.

17. The method as in claim 16 further comprising applying a second voltage to the conductive element to cause the beam layer to rotate to a second desired position.

18. The method as in claim 17 wherein the voltage is a positive voltage and the second voltage is a negative voltage.

* * * * *